Patented July 4, 1939

2,165,130

UNITED STATES PATENT OFFICE 2,165,130

INCREASING THE DRYING PROPERTIES OF OIL

Mayne R. Coe, Washington, D. C.

No Drawing. Application August 10, 1936, Serial No. 95,276.

6 Claims. (Cl. 260—406)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

The object of my invention is to provide a means for increasing the drying properties of an oil by the addition of photo-sensitizers capable of catalyzing autoxidation. More specifically stated, the object of my invention is to add to any drying or semi-drying oil (unsaturated oils), any of the plant pigments, lyochromes, porphyrin compounds of animal or plant origin and oxidizing dyes such as fluorescein, malachite green and eosin to catalyze autoxidation.

Autoxidation of drying or semi-drying oils may be brought about very quickly by the addition of magnesium chlorophyll or iron chlorophyll. It is necessary for the photosensitizer, e. g. chlorophyll, to be incorporated in the oil in such a manner that there is intimate contact of the oil, molecule for molecule with the oxidizer. Experiments have shown that chlorophyll dissolved in mineral oil does not provide a satisfactory intimate contact with the drying oil due to absence of drying properties of the mineral oil and thus autoxidation is not so appreciably increased. On the other hand if the chlorophyll pigment is ground into the drying oil to the point of dissolving in it or introduced by means of a volatile solvent such as acetone, carbon tetrachloride or ether so that there is complete elimination of the solvent upon evaporation, the treated oil acquires drying properties rapidly, due to the more complete solution of oil and the photosensitizer.

Autoxidation takes place comparatively fast in the presence of sunlight but it takes place still faster with irradiation by ultra-violet light. In this process, the substances, acting as photosensitizers, bring about autoxidation by photochemical action. In other words, chlorophyll and the other photosensitizers specified act as oxygen carriers, similar to haemoglobin in the blood, but the receiver of the oxygen in this case is the unsaturated double bond in the oil.

Magnesium chlorophyll is preferable to other chlorophyll derivatives, e. g. copper chlorophyll, because after a certain time of exposure to light the color changes more readily from a green to a brownish color and because magnesium chlorophyll is a better autocatalytic agent. Copper chlorophyll is more apt to retain the green color and is less active than magnesium chlorophyll for oxidizing an oil. Iron chlorophyll acts almost as quickly as magnesium chlorophyll for inducing drying properties.

For example, the process of treating a drying oil like raw linseed oil or tung oil and semi-drying oils like cottonseed oil, fish oil, or soy bean oil is to introduce magnesium chlorophyll, which may be (to produce an oil suitable for use in paints or varnishes) in crude or dry waxy form, into a volatile solvent, which is also soluble in the oil (such as acetone, carbon tetrachloride or ether) in the proportion of one-half to one gram of the plant pigment to five gallons of oil and irradiate under either an ultra violet lamp or under a "CX" Mazda lamp, the light from which approximates sunlight. Actual sunlight may be used if it could be made practical from a commercial standpoint. In order to make a uniform product, the oil must be kept in motion either by bubbling air through it or by means of a stirring machine. This process should continue until the green color changes to a brown and in the case of semi-drying oils, especially, the peroxide value should have developed above 600 for an oil to solidify or dry quickly. The addition of chlorophyll several times may prove advantageous in hastening oxidation. Experiments show that at a peroxide value of 200 an oil rapidly approaches the solidifying point, which is around 900. Under ordinary circumstances, without using a photosensitizer, it takes a number of months for a semi-drying oil to reach a peroxide value of 900, that is, the solidifying stage, but by the present invention that stage is reached in comparatively a few hours. Photosensitizers other than chlorophyll may be used but after chlorophyll has performed its function it turns more nearly the color of the oil and is not an objectionable addition to the oil. More chlorophyll may be added after the former has turned brown if it is desired to continue accelerated autoxidation.

Metals such as copper, iron, zinc and their metallic salts very strongly favor oxidation and therefore the processing of oils under the present invention in receptacles made of any one of the above metals, but preferably copper, would assist materially in bringing about the end product, as disclosed above.

Having fully disclosed my invention I claim:

1. The process of increasing the drying properties of unsaturated oils other than non-drying oils, which comprises incorporating into the oil a photosensitizer capable of catalysing autoxidation and exposing the resulting product for a period of time to light rays capable of inducing autoxidation.

2. The process of increasing the drying properties of drying oils, which comprises dissolving into the oil a photosensitizer capable of catalysing autoxidation and exposing the resulting product for a period of time to wave lengths of light capable of inducing catalyzing autoxidation.

3. The process of increasing the drying properties of drying and semi-drying oils, which comprises incorporating a plant pigment into the oil and exposing the resulting product for a period of time to light rays capable of inducing autoxidation.

4. The process of increasing the drying properties of vegetable and animal oils, which comprises incorporating porphyrin compounds into the oil and exposing the resulting product for a period of time to light rays capable of inducing autoxidation.

5. The process of increasing the drying properties of drying and semi-drying oils, which comprises incorporating oxidizing dyes into the oil, and exposing the resulting product for a period of time to light rays capable of inducing autoxidation.

6. The process of increasing the drying properties of unsaturated oils other than non-drying oils, which comprises dissolving magnesium chlorophyll in the oil, and exposing the resulting product for a period of time to light rays capable of inducing autoxidation.

MAYNE R. COE.